(12) United States Patent
McInerny (10) Patent No.: US 9,965,131 B1
(45) Date of Patent: May 8, 2018

(54) SYSTEM AND PROCESSES TO CAPTURE, EDIT, AND PUBLISH PROBLEM SOLVING TECHNIQUES

(71) Applicant: Amazon Technologies, Inc., Reno, NV (US)

(72) Inventor: Michael James McInerny, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1156 days.

(21) Appl. No.: 14/032,015

(22) Filed: Sep. 19, 2013

(51) Int. Cl.
| | |
|---|---|
| G06F 3/048 | (2013.01) |
| G06Q 50/00 | (2012.01) |
| G06F 17/21 | (2006.01) |
| H04H 60/29 | (2008.01) |
| H04H 60/76 | (2008.01) |
| G06F 3/01 | (2006.01) |
| G06F 11/34 | (2006.01) |
| H04H 60/33 | (2008.01) |

(52) U.S. Cl.
CPC ............... *G06F 3/048* (2013.01); *G06F 3/01* (2013.01); *G06F 11/3495* (2013.01); *G06F 17/218* (2013.01); *G06Q 50/01* (2013.01); *H04H 60/29* (2013.01); *H04H 60/33* (2013.01); *H04H 60/76* (2013.01)

(58) Field of Classification Search
None
See application file for complete search history.

(56) References Cited

U.S. PATENT DOCUMENTS

| | | | | |
|---|---|---|---|---|
| 7,902,997 | B2* | 3/2011 | Stehle | G06F 17/30867 340/901 |
| 7,996,853 | B2* | 8/2011 | Bendiksen | G06F 11/3495 719/328 |
| 8,285,654 | B2* | 10/2012 | Bajrach | G11B 27/031 706/14 |
| 8,352,980 | B2* | 1/2013 | Howcroft | H04H 60/46 705/14.4 |
| 2006/0161443 | A1* | 7/2006 | Rollins | G06Q 10/087 702/19 |
| 2006/0230352 | A1* | 10/2006 | Nielsen | G06F 17/2725 715/700 |
| 2012/0191545 | A1* | 7/2012 | Leibu | G06Q 30/02 705/14.66 |
| 2013/0076493 | A1* | 3/2013 | Christensen | G06Q 20/20 340/10.42 |
| 2014/0180595 | A1* | 6/2014 | Brumback | A61B 5/0015 702/19 |

* cited by examiner

Primary Examiner — Gurkanwaljit Singh
(74) Attorney, Agent, or Firm — Lee & Hayes, PLLC (57) ABSTRACT

This disclosure is directed to systems and processes of capturing a user's actions, computing actions, and/or other data, and then publishing relevant portions of the user's actions, computing actions, and/or other data to other users in a user community. The systems and processes provide techniques to minimize time and effort to create publications for the user community, while allowing the user to select relevant content and possibly annotate the content. Publication may be directed to other users that are likely to perform a similar computing action and/or to shared repositories.

20 Claims, 10 Drawing Sheets

SYSTEM AND PROCESSES TO CAPTURE, EDIT, AND PUBLISH PROBLEM SOLVING TECHNIQUES

BACKGROUND

People tend to learn new and/or better ways to diagnose and solve problems by being exposed to another person's diagnosis of and/or solution to a problem. In business environments where problems are regularly handled by a community of problem-solvers, businesses have attempted to increase the efficiency of problem-solving by the community using tools such as standard operating procedures (SOPs), intranet sites, best practices, and other types of knowledge sharing resources.

Traditionally, information technology (IT) support personnel respond to work orders that are generated by a system in response to problems identified by the system. After diagnosing and solving the problem, a person that diagnosed and solved the problem may write a description of the particular method of diagnosis and solution used to address the work order. This description is then typically logged and is retrievable by other members of the community. However, this approach is time-consuming and does not necessarily capture enough information or the right information to help properly educate other personnel. For example, the descriptions may leave out portions that another person may find useful. Furthermore, it may be difficult for people to find relevant descriptions and relevant sections of the descriptions in the collection of descriptions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to systems and processes of capturing a user's actions and publishing relevant portions of the user's actions to other users in a user community in such a manner that the user spends minimal time and resources preparing a publication for the user community. For example, the user community may periodically encounter an issue and handle it in particular or disparate ways. The user whose actions are captured may know of a more expedient or effective manner of dealing with the issue.

In some embodiments, systems or processes may automatically capture the user's actions as the user handles the issue and provide functionality that allows the user to quickly and easily sort through the captured data regarding the user's actions to identify/select key portions of the user's actions that would be useful to the user community. In various embodiments, the user may insert annotations to explain the user's actions and/or to draw attention to particular portions of the user's actions. This method provides users in the user community with a way to log their actions in minimal time and with little effort. In one or more embodiments, the systems or processes may capture data pertaining to the user's actions and segment this data so that the user may select data segments or elements within the data segments pertaining to important portions of the user's actions that are desirable for publication to the user community.

In some instances, to ensure that all relevant data is captured, the systems or processes may automatically start capturing the data pertaining to the user's actions responsive to a defined trigger. In other instances, capture may be triggered by the user. Similarly, the systems or processes may terminate the capture or the user may terminate the capture. The systems or processes may further include tagging to make the published data discoverable by other users in the user community. For example, the systems or processes may generate tags describing, without limitation, the user's actions, system responses, and event types. These tags may be used to automatically present the published data to other users in the user community. Further, the tagging may include an analysis that may be used to segment the data.

The techniques and systems described herein may be implemented in a number of ways. Example implementations are provided below with reference to the following figures.

Illustrative Environment

Figure 1:
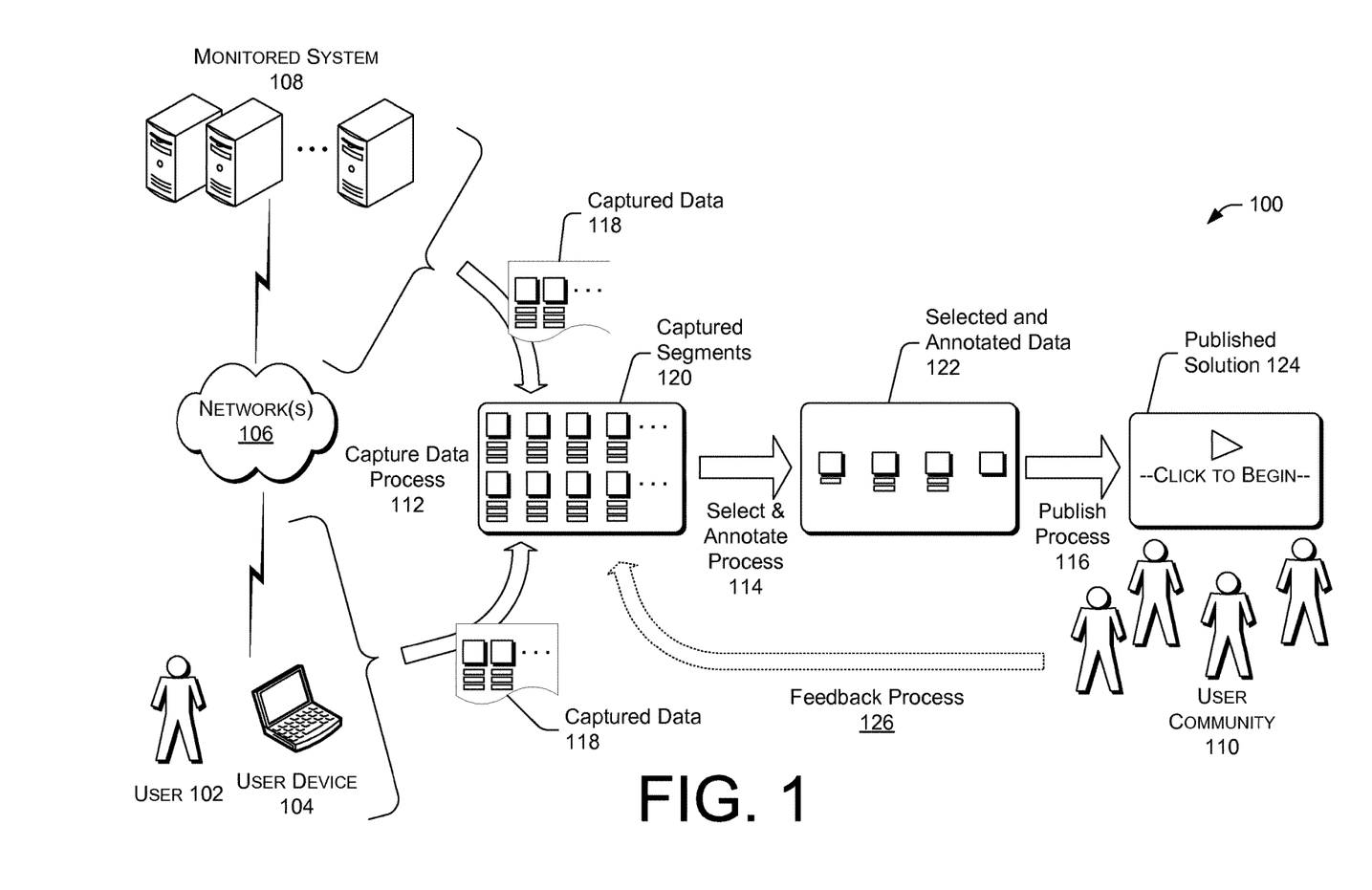
FIG. 1 is a schematic diagram of an illustrative environment to capture and disperse relevant information used to solve a problem.

FIG. 1 is a schematic diagram of an illustrative environment 100 to capture and share relevant information used to solve a problem, such as perform a computing task, respond to a system event, or take other actions. The environment 100 includes a user 102 associated with a user device 104. The user 102 may interact with the user device, which may be in communication with a network 106, to access a monitored system 108 via the network 106. The monitored system 108 may be any type of system that facilitates computing processes. The monitored system 108 may be a distributed system (e.g., a cloud services system, etc.) or a non-distributed system (e.g., a local computing device, etc.). The user device 104, on the other hand, may be any type of electronic computing device, such as a notebook computer, a tablet, a smartphone, a gaming console, and so forth.

By interacting with the user device 104 and/or the monitored system 108, the user 102 may perform one or more computing tasks, such as solving a particular computing problem. Ultimately, in response to performing the task, relevant data may be collected during performance of the task and then published to a user community 110. The relevant data may include information related to the actions of the user 102, interactions of the user 102 with the user device 104, data on the network 106, and/or reactions and data of the monitored system 108. The environment 100 may facilitate processes and/or systems to perform the processes that include a capture data process 112, a select and annotate process 114, and a publish process 116.

As an example, the user 102 may know of an expedient and/or efficient manner of performing a task that, if properly communicated to the user community 110, would provide a benefit to the user community 110. In this example, the user 102 may interact with the user device 104 to perform the task, such as respond to an event generated by the monitored system 108. The event could be virtually any type of computing problem that needs to be solved, process that needs to be executed, and so forth. For example, the event could be an overheated server alert, which results in a task to identify a cause and resolution in response to the alert.

In accordance with some embodiments, the monitored system 110 may generate an error or event and communicate the error or event to the user device 104 via the network 106. The error or event may be automatically detected and forwarded to the user device 104 as a work order or other type of notification. In various embodiments, the user 102 may detect the error by monitoring the monitored system 108 by way of the user device 104 via the network 106. For example, the error or event may be formatted as a work order and stored on a server for retrieval by the user 102 via the user device 104.

In accordance with various embodiments, the capture data process 112 may include capturing data (captured data 118) from various sources. The environment 100 may enable data capture from the monitored system 108, the network 106, the user device 104, and/or the user 102 in an attempt to capture data that is relevant to the user community regarding a manner of performing a task. The captured data 118 may include one or more of screen renderings, user inputs (e.g., keyboard inputs, selection inputs, etc.), audio data, user action data, and/or other data generated by observing operation of the devices (e.g., the user device 104 and/or the monitored system 108) and/or actions of the user 102. For example, the captured data 118 may include screen renderings of the user device 104 as the user interacts with the user device 104. The screen renderings may be used to create an animated sequence, such as playing the renderings as a video. After the user finishes performing the task (e.g., completes a response to an event, etc.), the capture data process 112 may be terminated. The captured data 118 may then be made available to the user for selection and annotation, as described below.

In some embodiments, the captured data 118 may be segmented into multiple segments as captured segments 120 that are identified based on predetermined events or actions. For example, the captured data 118 may be segmented based on elapsed time, user actions, changes in data, changes in alarm state, and so forth. The segments may be presented to the user for selection. The segmenting may be performed during the capture data process 112 and/or after the data capture process 112. For example, the segmenting may be performed by capturing discrete actions, data, or other information during the data capture process 112 and storing these actions, data, or other information as individual segments. Further, the segmenting may be performed automatically without user interaction, but may also enable a user to perform segmentation.

The select and annotate process 114 may enable the user 102 to select portions of the captured segments 120. For example, the user 102 may be presented with a series of segments that include the captured data in a chronological order. Each segment may be selectable as a whole or in part (e.g., may include selectable information within the segment, etc.). The user 102 may then select segments and/or data within segments as necessary to convey information to explain or teach a solution used to solve the computing problem. In some embodiments, parts of solution may conform to a standard operating procedure (SOP) while other parts may deviate from the SOP. The manner in which the captured data 118 is made available to the user allows the user to quickly and easily select the portions of the captured data 118 that portray the more expedient and/or efficient manner of handling the event to be disseminated to the user community 110. For example, a user may remove missteps that were not helpful in solving the problem. However, the user may also choose to retain some steps that may not be readily apparent as being part of the solution, such as steps that include exploring branches of the SOP to determine information about the problem.

The user 102 may annotate the selected segments or portions of the segments using annotation tools, such as a text tool, a drawing tool, etc., which may be used to provide explanatory information, highlight areas of focus, and so forth. The annotation may include adding slides (or segments), manipulating segments or portions thereof, and so forth. By allowing the user 102 to make annotations to the data, the user has the opportunity to clarify or distinctly point out portions of the data that indicate more expedient and/or efficient event-handling practices, for example. Selected and annotated data 122 is a result of the select and annotate process 114. However, annotation may not be performed on all or even any of the segments in some instances. In some embodiments, the selected and annotated data may be tagged or otherwise include tags, indexes, descriptors, or other metadata that describes the captured data, the task, the event, the user, the user community, the environment, and/or other relevant information.

The publish process 116 may allow publication of the selected and annotated data 122 to the user community 110 as a published solution 124. The publication may be provided to a preselected location, such as a virtual bulletin board, intranet site, wiki site, a big screen in a common area, etc.; provided via a broadcast or messaging service; and/or may be inserted or otherwise made available to users that are expected to perform the same or similar tasks. For example, the tagging described above may be used to link a publication that explains how to solve a problem to a system request (e.g., event) that requires solving the same problem or a similar problem. By providing the publication with a system request, another user may benefit from the information in the publication when responding to the system request or otherwise when performing at task.

In some embodiments, the environment 100 may include a feedback process 126 that may provide a mechanism to receive feedback and/or other input from the user community 110. The feedback may include ratings, corrections, updates, comments, added tags, and/or other data that may be associated with the published solution 124. In some instances, the feedback may be used to modify the solution, such as by updating the captured data 118, the captured segments 120, and/or the selected and annotated data 122.

By automating capture of data and simplifying a selection and annotation process that are performed by the user 102, the processes described above may reduce an amount of time for the user 102 to relay information regarding the user's manner of performing a task, such as handling a response to an event.

Illustrative Device Diagram

Figure 2:
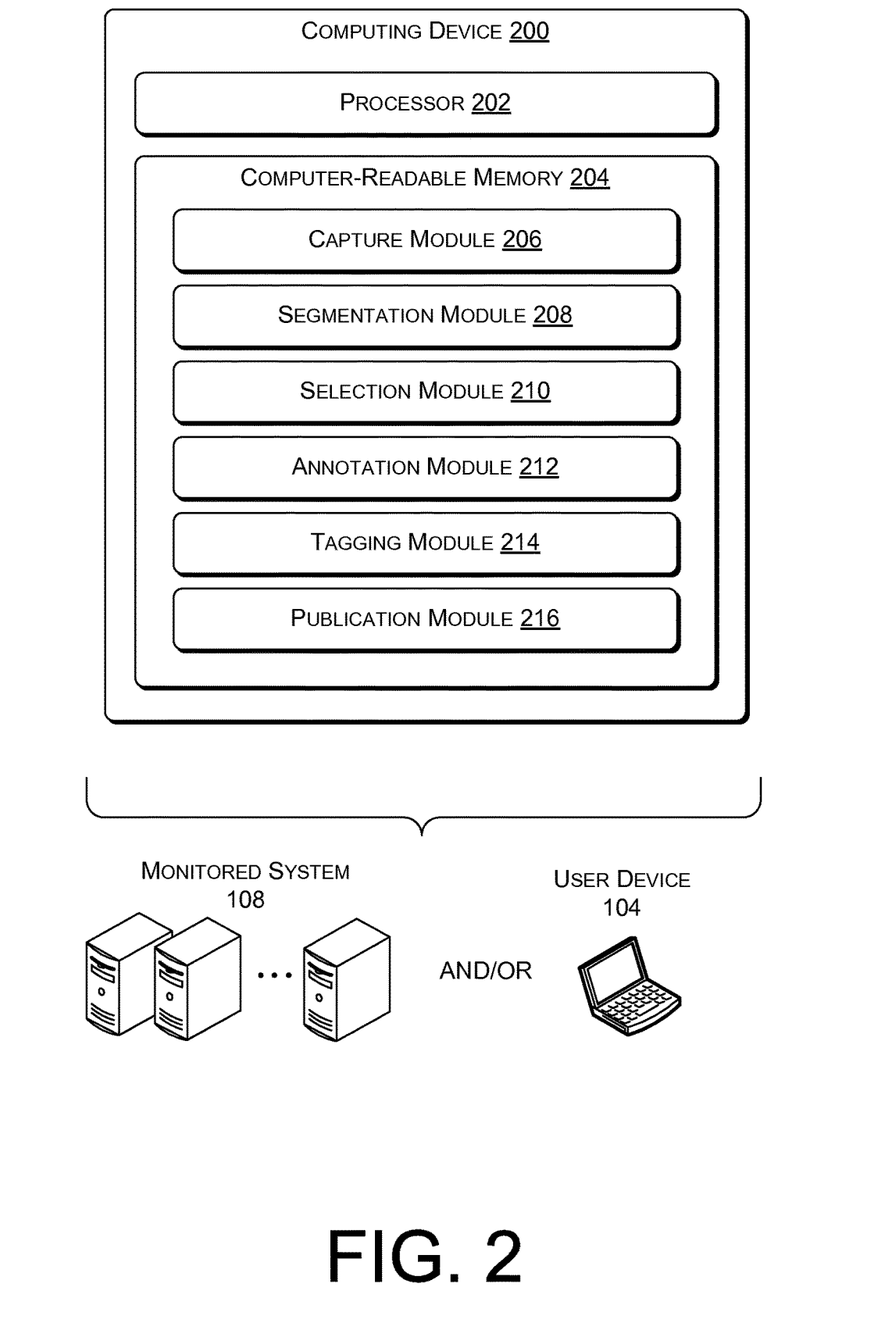
FIG. 2 is a block diagram of an illustrative computing device to capture, segment, select, annotate, and/or publish data relating to a user's interaction with a problem, task, or event.

FIG. 2 is a block diagram of an illustrative computing device 200 having illustrative modules to capture, segment, select, annotate, and/or publish data relating to a user's interaction with an event. Although the modules are shown as residing within the computing device 200, some or all of the modules may be available or accessible from a remote device, such as a cloud services system or other distributed computing resource system. The computing device 200 may represent the user device 104, the monitored system 108 or a portion of the monitored system. For example, when the user 102 interacts directly with the monitored device 108, the modules may reside on that particular device.

The computing device 200 may include one or more processors 202 and computer-readable memory 204. The computer-readable memory 204 may store various modules, applications, programs, and/or other data. The computer-readable memory 204 may be collectively referred to as computer-readable storage media. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable memory 204 may store instructions that, when executed by the one or more processors 202, cause the one or more processors to perform the operations described herein for the illustrative computing device 200. The computer-readable memory 204 may store a capture module 206, a segmentation module 208, a selection module 210, an annotation module 212, a tagging module 214, and a publication module 216, each discussed in turn.

The capture module 206 may capture data related to a task. The capture module 206 may initiate the capture in response to a trigger. The trigger may be based on a system event (e.g., receipt of a service ticket or work order, system error, etc.) or may be based on a user action (e.g., command to start the capture, other user action, etc.). The capture module 206 may then capture data, such as screen renderings, user inputs (e.g., keyboard inputs, selection inputs, etc.), audio data, user action data (e.g., eye tracking, expression tracking, etc.), and/or other data generated by observing operation of the devices (e.g., the user device 104 and/or the monitored system 108) and/or actions of the user 102. The data may be stored at least temporarily as the captured data 118. The capture module 206 may continue to capture data until the capture data process 112 is terminated based on a system event, user action, or other trigger.

The segmentation module 208 may segment the captured data into the captured segments 120 that are identified based on predetermined events or actions. For example, the captured data 118 may be segmented based on elapsed time, user actions, changes in data, alarm state, and so forth. The segmenting may be performed automatically without user interaction, but may also enable a user to perform segmentation. In some embodiments, the segmenting may be performed during the capture process, and thus may be performed by the capture module 206 that may record or store the data in segments, each having a start trigger and an end trigger.

The selection module 210 may present the captured segments to the user 102 for selection of the segments or data within the segments. The selection module 210 may arrange the segments in a user interface that provides an easy way for the user to quickly select relevant segments or portions of segments. For example, the segments may be presented in chronological order in a summary form, which may allow easy identification and selection of the segments or portions of the segments.

The annotation module 212 may enable the user to annotate the selected segments or portions of the segments using annotation tools, such as a text tool, a drawing tool, etc., which may be used to provide explanatory information, highlight areas of focus, and so forth. The annotation module 212 may facilitate adding slides (or segments), manipulating segments or portions thereof, and so forth. By allowing the user 102 to make annotations to the data, the user has the opportunity to clarify or distinctly point out portions of the data that indicate more expedient and/or efficient event-handling practices.

The tagging module 214 may tag the captured data. The tagging module may associate tags, descriptors, or other metadata that describes the captured data, the task, the event, and/or other relevant information. The tagging module 214 may enable searching for the solutions represented by the captured data 118. The tagging module 214 may also enable select publication of the solution represented by the captured data 118 in relevant situation, as described below.

The publication module 216 may publish the selected and annotated data 122 to the user community 110. In some embodiments, the publication may "finalize" the selected and annotated data 122 for publication, such as by creating a single file or executable file that contains the selected and annotated data 122. However, the publication module 216 may retain some or all of the raw data to enable additional editing (e.g., selections, annotations, etc.) after publication. The publication module 216 may publish to a preselected location, such as a virtual bulletin board, intranet site, wiki site, a big screen in a common area, etc., and/or using distribution tools such as a messaging system, a broadcast system, or other distribution systems. In some embodiments, the publication module 216 may create a compilation that includes highlights from various solutions, which may be presented to the user community for educational purposes. The publication module 216 may publish the solution with relevant parts of an existing SOP and/or may modify the SOP to include the solution or create a new SOP using the solution. The publication module 216 may insert or otherwise make the solution represented by the captured data 118 available to users that are expected to perform the same or similar task. For example, the information generated by the tagging module 214 described above may be used to link a publication that explains how to solve a problem to a system request (e.g., event) that requires solving the same problem or a similar problem. By providing the publication with a system request, another user may benefit from the information in the publication when responding to the system request or otherwise when performing at task.

In some embodiments, the publication module 216 may enable collection of feedback from the user community 110. For example, the users in the user community 110 may rate the publication, suggest changes, provide comments, and so forth. In some embodiments, the publication module may use feedback to create a highlight reel of publication based on the ratings and/or other criteria.

Illustrative Operation

Figure 3:
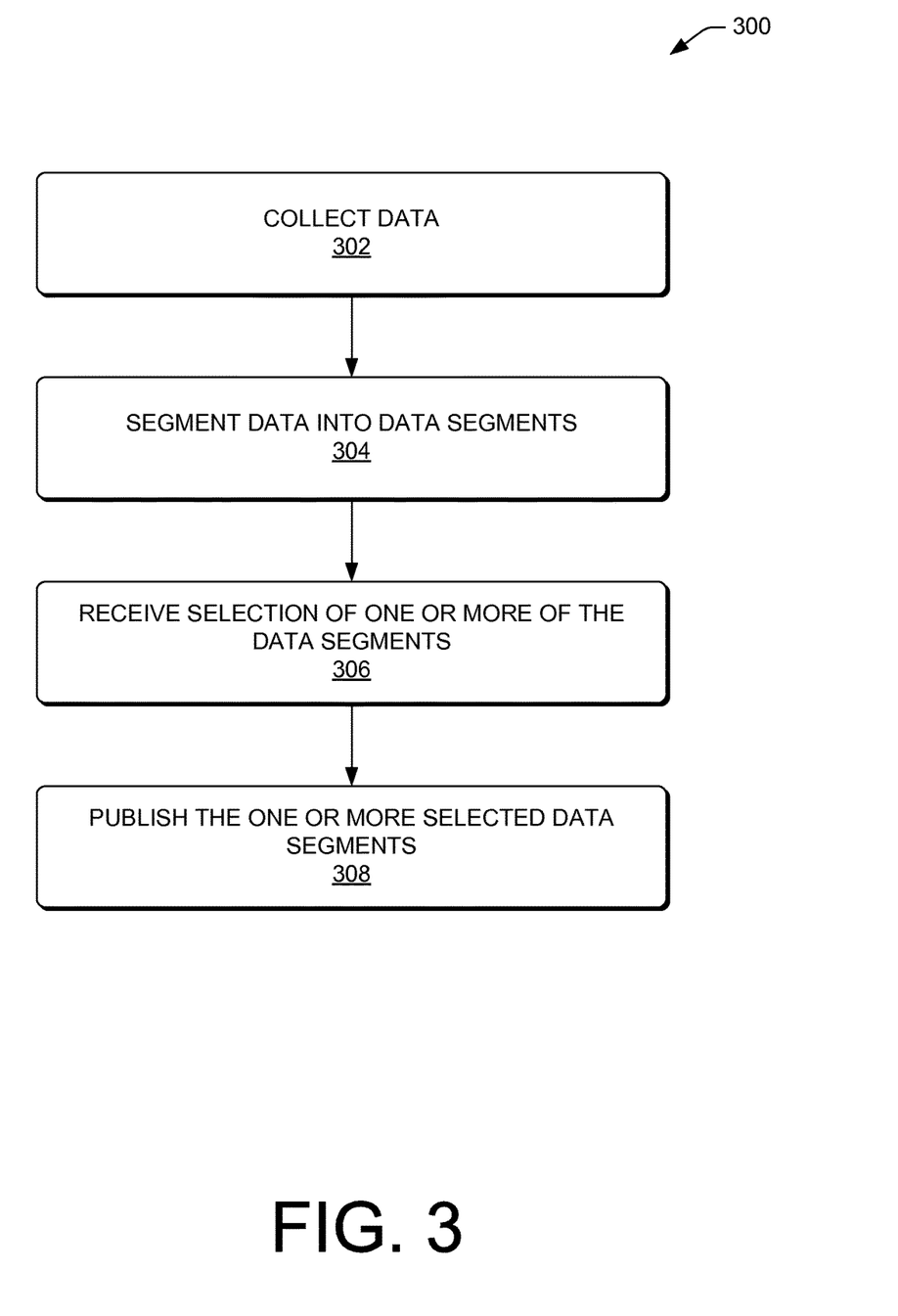
FIG. 3 is a flow diagram of an illustrative process to capture data relevant to a diagnosis and a solution of a problem, and a process to publish this data in an easily-digestible format.

FIG. 3 is a flow diagram of an illustrative process 300 to capture data pertinent to the diagnosis and solution of a problem and publishing this knowledge in an easily-digestible format. The process 300 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

The process 300 is described with reference to the illustrative environment 100 and the illustrative device 200, and may be performed by the user device 104, the monitored system 108, or any other device or combination thereof. Of course, the process 300 (and other processes described herein) may be performed in other similar and/or different environments and/or by other devices.

At 302, the capture module 206 collects data while the user 102 performs tasks to solve a problem (e.g., respond to an event). The type of data collected may include, without limitation, data processed by the illustrative computing device 200, inputs to the illustrative computing device 200, outputs from the illustrative computing device 200 (e.g., screen, text, audio, etc.), and/or other data accessible to the illustrative computing device 200. Examples of such data include, but are not limited to: system environment data, user actions, and system states. System environment data may include, for example, location data, environmental data (e.g., temperature(s) of components, etc.), operating system states and types, mechanical performance (e.g., fan speeds, etc), and other system environment data. User actions may include, for example, interaction with an input device such as a keyboard, mouse or touchpad; speech; bodily movements; eye gaze; etc. System states may include, for example, whether a pre-determined threshold is exceeded or not, flag states, task completion status, general states of the system, etc. Specific types of data that may be collected may include, for example and without limitation, screenshots; video; audio; time; environment data such as an operating system, country, make, model, language, etc.; keystroke logs; event logging; active or in-focus windows; highest-level windows; software tracing; register data; stack data; clipboard data; touchpad data such as gestures and multi-touch data; eye-tracking; user bodily movement data; mouse data such as scrolling, zooming, cursor movements and/or hovering, and panning; system metrics; and biometric data. The collection operation may include capturing data, receiving data from another device/location, or a combination thereof.

When the event is a task to be completed on a remote computer, the data capture process 112 may include capturing key logs, a video of the user's actions on the device connecting to the remote computer, a video of the user's actions on the remote computer, event logging, task completion progress information, and audio. As discussed herein, a video may include a sequence of renderings of visual data, such as snapshots of a window or display, etc. For example, when the event is a customer-submitted query regarding a shipment, the capture data step 302 may include capturing audio of a phone conversation between the user and the customer, information regarding the shipment, customer information, and a video of the user's screen as they handle the event. The audio may be transcribed using speech recognition, and the resulting text may be used by the tagging module 214 or for other purposes.

According to some embodiments, the operation 302 may begin responsive to a user indication. The user may, for example, make an indication to initiate the capturing of the data by selecting an option provided via a graphical user interface. In other embodiments, the user may make a motion, a touchpad gesture, a vocal sound, or any other outward or inward manifestation of a desire or any combination thereof to begin the capturing data. In various embodiments, the data capture may initiate in response to a trigger, and therefore may not require the user to make an indication to initiate the capturing of the data. The trigger could be associated to a work order, ticket or request to perform a task, as one possible example.

At 304, the segmentation module 208 may segment the data into data segments. Segmenting the data may provide discrete data segments that can be presented to the user 102 to allow the user to quickly and easily select relevant portions for publication to the user community 110. In particular, segmentation module 208 segments the data into captured segments 120 in order to allow the user 102 to distinguish portions of the captured data that would not be useful to the user community from portions of the captured data that the user believes would be useful to the user community. In some embodiments, the segmentation may occur during the capturing of the data, such as by capturing the data in segments.

The segmentation module 208 may segment the data using any number of techniques. These techniques may include, without limitation, segmenting the data based on a time interval, user indication, and/or intelligent detection of interest points. The interest points may comprise, for example and without limitation, system state changes (e.g., alarm state, etc.), user input/output type changes, user input/output starts or stops, comparison data derived from analysis of an SOP, and/or environment state changes. For example, interest points corresponding to relevant data may be a change in the rate of change of a variable value, an input/output device starting or stopping to receive or send data, or a reverse in an environment variable trend, as possible examples.

To illustrate by way of example, the user 102 may spend time handling an event by opening a work order explaining the event, then open applications with appropriate diagnostic tools to handle the event, look at and talk about a graph created by a first application, click on a second application and enter commands, wait for a time while watching the graph and providing verbal commentary, and then exit one or more applications. Assuming audio and video (e.g., a series of screenshots, etc.) were captured, the segmentation module 208 may segment the video capture for at least events such as when the user opens the work order, when the user opens the first application, when the user clicks on the second application, after a pre-defined threshold of time without any user input while the user watches the graph, and then again when the user closes the applications. In various embodiments, segmentation of different types of data captured may occur at different times than segmentation of other types of data. For example, in the example given above, the audio may be segmented every time the user starts talking and when the user stops talking for longer than a pre-defined threshold of time.

In some embodiments, the segmentation module 208 may segment the data responsive to intelligent detection of interest points. For example, in the example given above where the user 102 uses an application to connect to a remote computer to complete a task, the segmentation module 208 may segment the key logs, video of the user's actions on the device connecting to the remote computer, video of the user's actions on the remote computer, event logging, task completion progress information, and audio based upon a plurality of interest points. The interest points in this example may include a point at which the user starts speaking, describing what the user is doing; when the user opens the application to connect to the remote computer; when the user starts an action to complete a portion of the task, such as, for example, typing commands into a command line interpreter; start and stoppage of user inactivity; when the task is indicated as being complete; when the user terminates the connection to the remote computer; and/or when the user indicates that the capture should stop. A voice recognition module may generate text based on the user's spoken words, which may be used as tags that are associated with the data segments. Image recognition may be used to generate text based on analysis of imagery, such as screenshots, etc., and may also be used as tags that are associated with the data segments.

In accordance with some embodiments, the segmentation may be based at least in part on a standard operating procedure (SOP). SOPs generally take the form of a flow diagram or step-by-step instructions indicating the manner in which individuals of an organizational entity are to respond to certain events. The segmentation module 208, or possibly the capture data module 206, may compare the data captured to the SOP for the particular kind of event. The data may be segmented at each step or branch of the SOP based upon a detection of where the events/actions conform or do not conform with the SOP. When detection fails and performed actions are different (divergent) than those actions specified in the SOP, that information may be added to the capture data and selectable.

At 306, the selection module 210 receives from the user 102 a selection of one or more of the capture segments. In some embodiments, the user 102 may select less than all of the capture segments in order to reduce the captured data disseminated to the user community 110 to the data most relevant to the user community 110. The selection module 210 may enable the user 102 to select portions of the data within a data segment. For example, if a data segment includes visible windows that are open on a user's display, then the selection module 210 may allow the user to select individual windows and/or data displayed within those windows. By using the selection module 210, the user may consolidate the length of a publication so that the publication is limited to relevant information that can be received (e.g., viewed) by the user community 110 in a relatively short amount of time as compared to the actual duration of the task being captured. For example, a task may take an hour to be performed, but the selected captured segments may only represent a few minutes of the time.

At 308, publication module 216 may publish the one or more selected data segments to the user community 110. Publication may take any of a variety of forms. For example, publication may generally comprise delivery and/or storage. Delivery may comprise, for example and without limitation, replay of the selected captured segments on a screen and/or via speakers, publication on a shared page (e.g., a social website, forum, etc.), attachment with a work order (e.g., a link, attachment, pop-up, etc.), and/or as a notification with an option to view the selected capture segments. The publication module 216 may store the selected capture segments on one or more memories of a device or disparate devices and the selected capture segments may remain available for editing and annotation to members of the user community 110. Furthermore, upon publication, the selected capture segments may be made available for annotation by the user community 110. Such annotations may include, for example and without limitation, comments, ratings, and tags. In some embodiments, the selected capture segments are stored and made available for retrieval by members of the user community 110. As described above, and also as described below with reference to FIG. 7, the process 300 may include an ability for the user, or other users, to make annotations.

Illustrative User Interface

FIGS. 4A, 4B, 5, and 6 show illustrative user interfaces (UIs) depicting presentation, selection, annotation, and editing of segmented capture data.

Figure 4A:
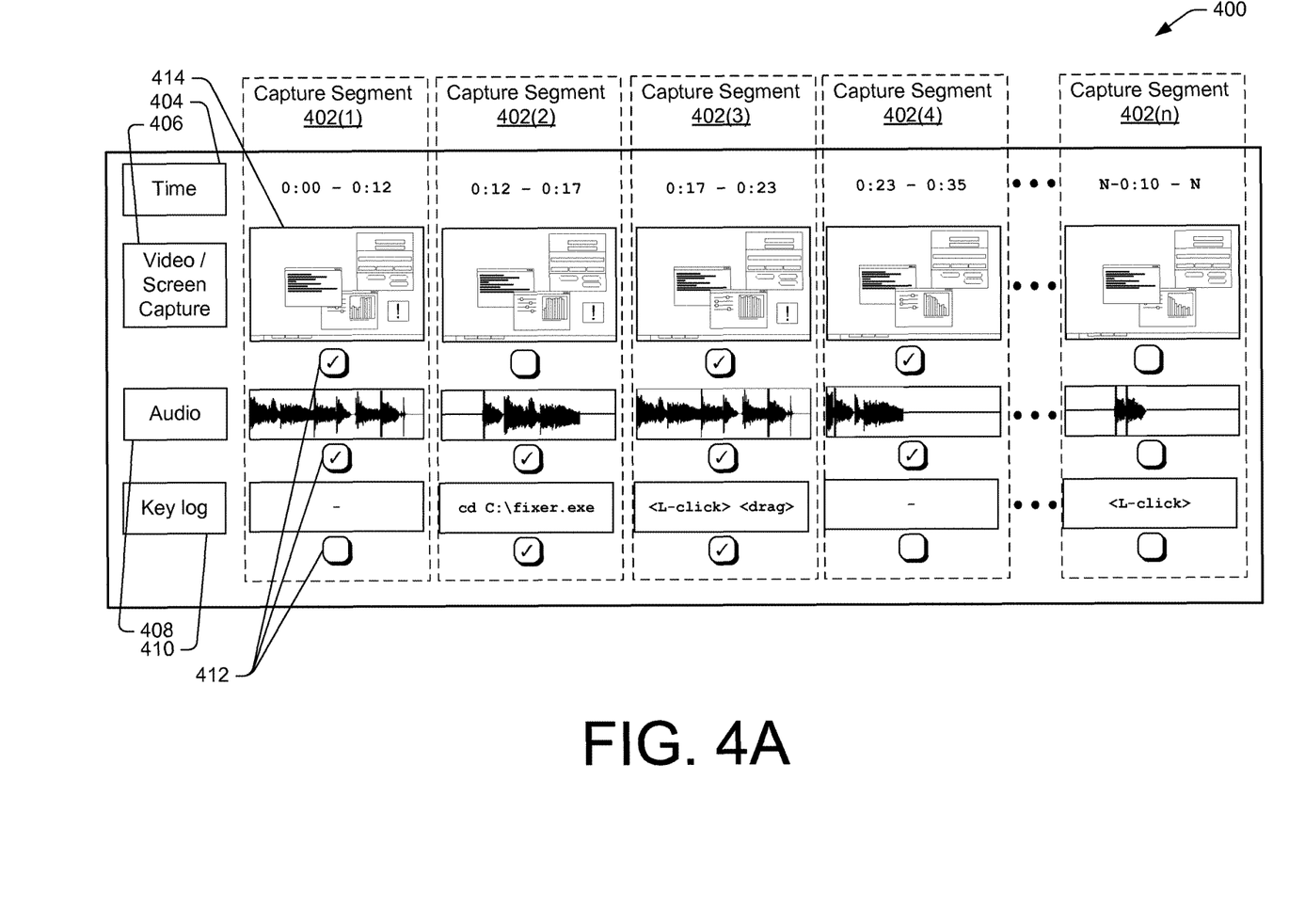
FIGS. 4A and 4B show illustrative user interfaces (UIs) depicting display of segmented captured data and selection of the segmented capture data relating to the diagnosis and solution of an exemplary event.

FIG. 4A shows an illustrative UI 400 depicting display of segmented captured data 402(1), 402(2), . . . , 402(n) and selection of the capture segments relating to the diagnosis and solution of an exemplary event. In particular, the illustrative UI 400 demonstrates data segmentation that includes video and screen capture segments 404 (e.g., screenshots, etc.), audio segments 406, key log segments 408 (user input data, selection data, etc.), and time data segments 410 that have been captured and segmented, although other data or any other combination of data could be captured, segmented, and displayed. Furthermore, the illustrative UI 400 may depict the capture segments as all being segmented at a same set of time series. In other embodiments, different types of data may be segmented using segments of different lengths as segments from other types of data.

Figure 5:
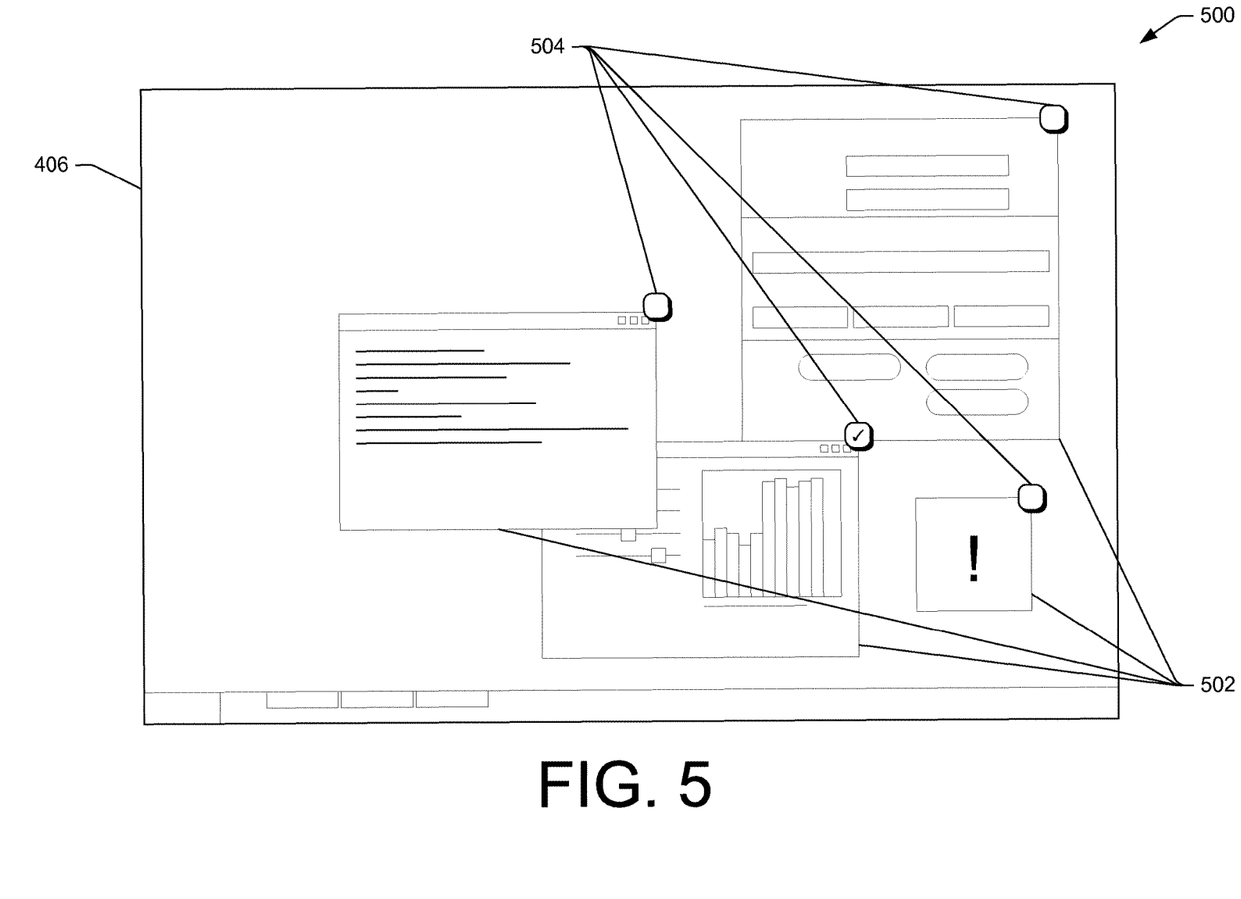
FIG. 5 shows an illustrative UI depicting selectable elements within captured data available for selection by a user.

The illustrative UI 400 may include selection controls 412 that enable the user to select portions of capture segments 402(1)-402(n). A user may choose to select different types of captured data from different capture segments for different reasons. For example, the user may want to include audio portions (e.g., transcript, etc) of capture segments 402(1) and 402(2) that captured the user's discussion of a graph in the video portion of capture segment 402. As shown in FIG. 5, the user 102 may also be able to select portions of information in a segment, such as a segment 414.

Figure 4B:
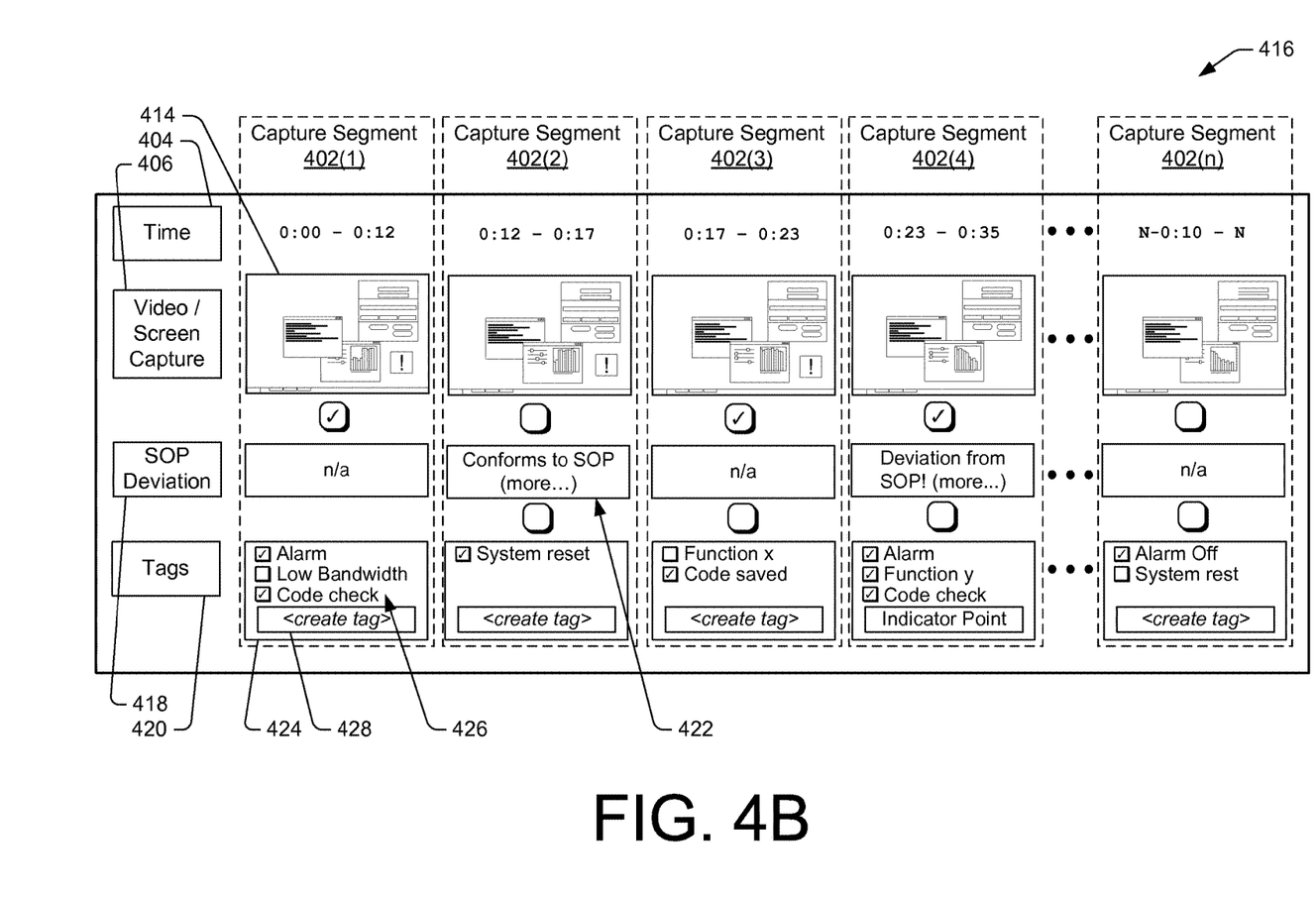

FIG. 4B shows an illustrative UI 416 depicting display of the segmented captured data 402(1), 402(2), . . . , 402(n). The information in the UI 416 may be interchangeably included with the information in the UI 400, and vice versa. In particular, the illustrative UI 416 demonstrates data segmentation that include the video and screen capture segments 404 (e.g., screenshots, etc.), SOP deviation segments 418, tag segments 420, and the time data segments 410 that have been captured and segmented, although other data or any other combination of data could be captured, segmented, and displayed. The SOP deviation segments 418 may show information 422 that indicates whether operations included in a particular segment deviate from operations included in the SOP. The operations may deviate from the SOP, conform to the SOP, or have no relation to the SOP (e.g., intermediary segments that occur been steps in an SOP, etc.). Additional information about the use of the SOP is provided below with reference to FIG. 9. The tag segments 420 may include a collection of tags 424 for each segment. The collection of tags 424 may include automatically generated tags 426 and/or user generated tags 428, any of which may be selectable by the user for association with the segment. For example, tags entered by a user may be automatically selected while the automatically generated tags may not be selected by default.

FIG. 5 shows an illustrative UI 500 depicting a detailed selection of portions 502 of a segment, such as the segment 414. Each portion may be associated with a respective selection control 504. The UI 500 may be accessed after selection of the segment 414, by a special command (e.g., double clicking the segment, etc.), or in other ways to access the detailed selection of the portions of the segment. In particular, FIG. 5 depicts one implementation of allowing a user to select portions of a video portion 414 of capture segment 402(1). Although FIG. 5 depicts a video portion, portions of any other type of data may be further selectable in an analogous manner. In this example, the user has selected the application with the graph by selecting the associated selection control. In response to selection of the selection control, the portion of the segment 414 (rather than the entirety of the segment 414) will be included in the publication, and may be used for further processing such as for annotations.

Figure 6:
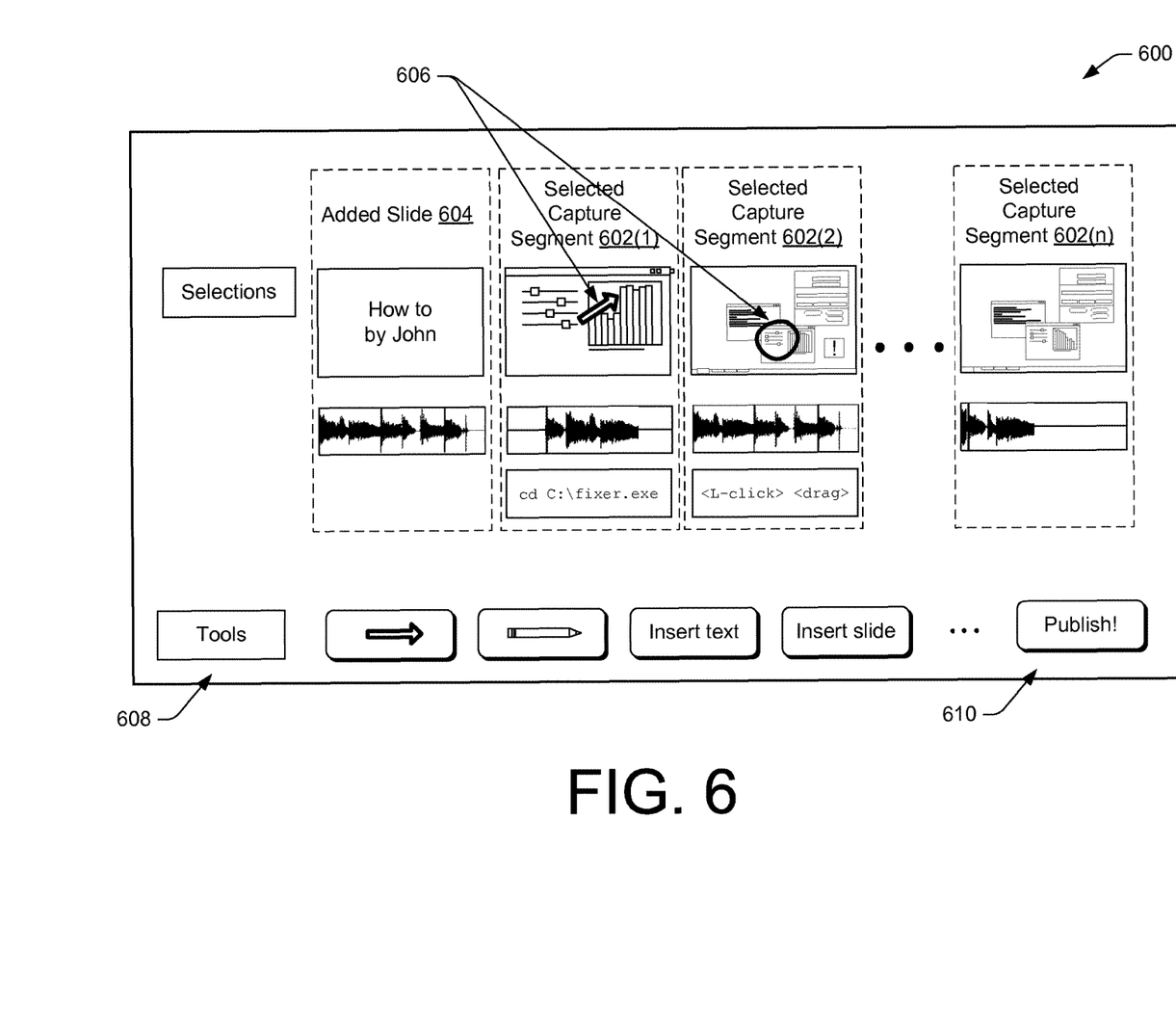
FIG. 6 shows an illustrative UI usable for annotating and publishing the selected capture elements.

FIG. 6 shows an illustrative UI 600 usable for annotating and publishing the selected capture elements. When the user finishes making selections via the UI 400 and/or the UI 500 of the portions of the capture segments 402(1)-402(5), the user may be provided with the UI 600 that includes the selected portions. The UI 600 may include selected capture segments 602(1), 602(2), . . . , 602(n), including selected video, audio, and/or other data. However, the user may decide not to select some types of data for a particular time frame, such as audio that does not provide helpful information, etc. The UI 600 may allow the user to annotate the selected capture segments, such as by inserting a slide 604, or adding annotation marks 606, and so forth. Annotation tools 608 may be accessible in the UI 600 to enable the user to perform annotations. The annotation tools 608 may include a shape tool (e.g., arrows, circles, blocks, etc.), a marker tool (e.g., line tool, shading tool, etc.), an insert text command, an insert slide (e.g., before/after a segment) command, and so forth. Although the illustrative annotation UI 600 only depicts a few annotation tools, any number of annotation tools may be provided to the user. When the user is done making annotations, the user may publish the annotated selected capture segments to the user community 110. The UI 600 may include a publish command 610 to finalize, at least temporarily, and publish the solution.

Illustrative Processes

Figure 7:
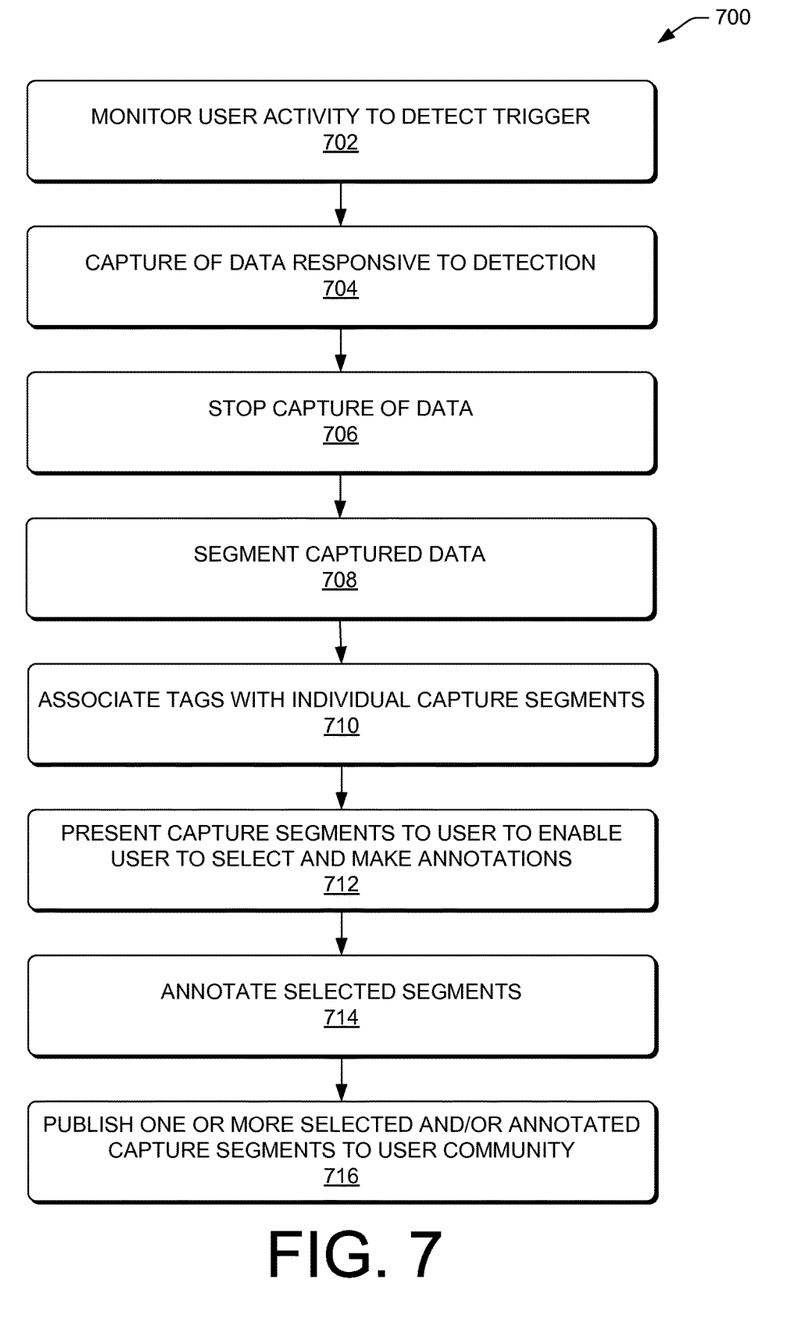
FIG. 7 is a flow diagram of an illustrative process to publish selected and/or annotated elements to a user community.
Figure 8:
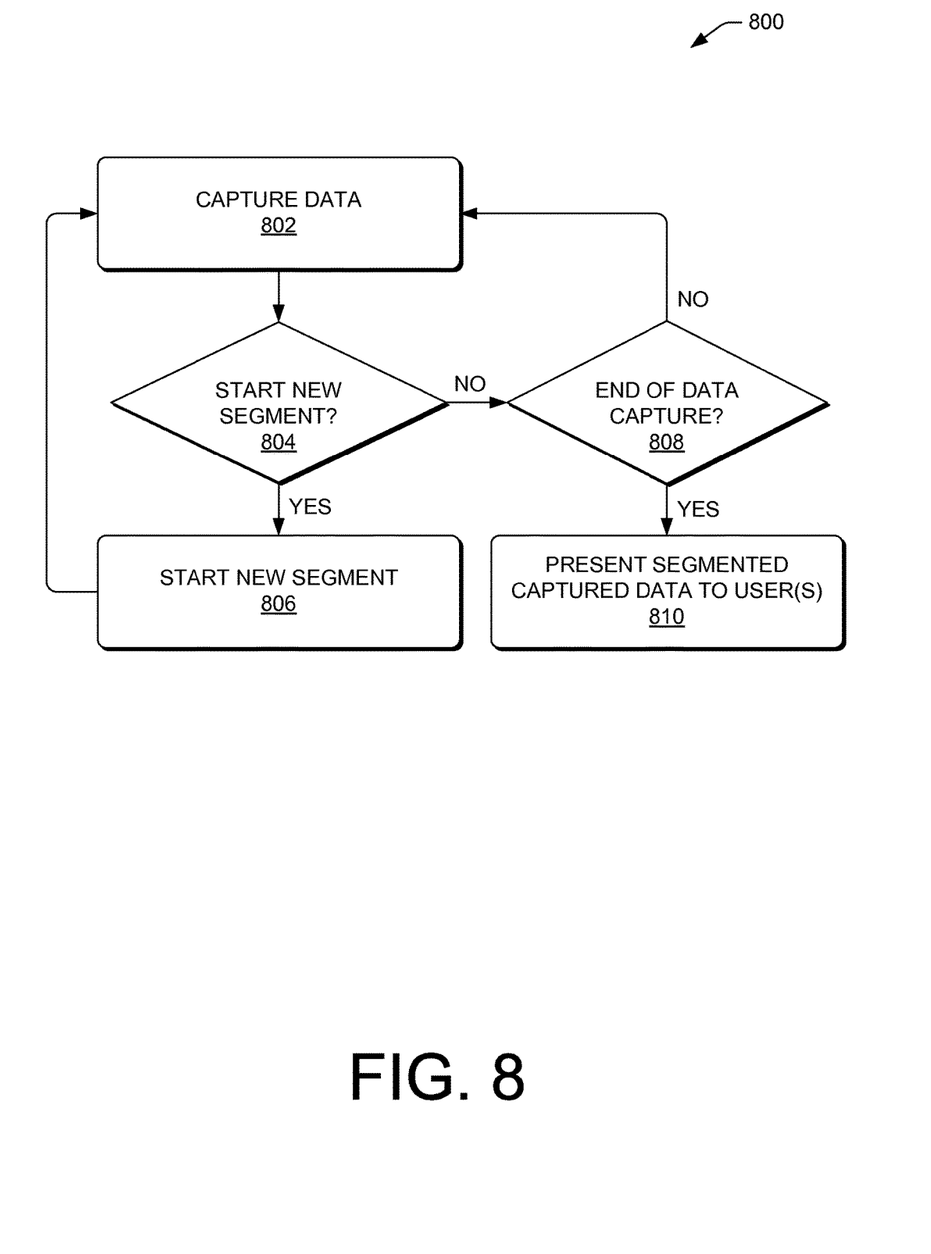
FIG. 8 is a flow diagram of an illustrative process to segment captured data and stop capture of data.
Figure 9:
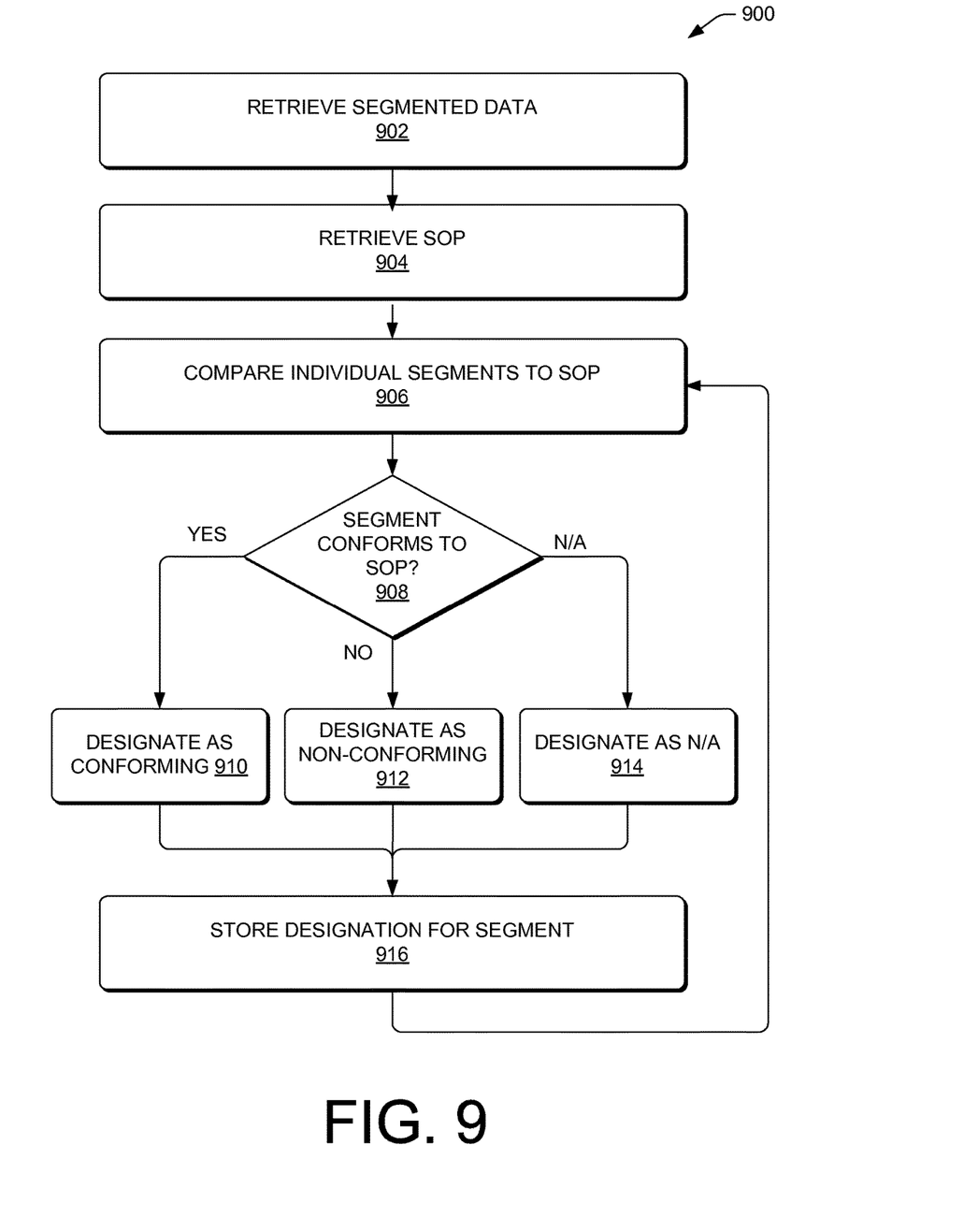
FIG. 9 is a flow diagram of an illustrative process to compare operations performed in data segments to operations in a standard operating procedure (SOP).

FIGS. 7, 8 and 9 are flow diagrams of illustrative processes to facilitate publication of selected and/or annotated segmented captured data to a user community. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the illustrative environment 100 and the illustrative computing device 200 and may be performed by the user device 104, the monitored system 108, or any other device or combination thereof. Of course, the process 700 may be performed in other similar and/or different environments and/or by other devices.

The process 700 details embodiments where the data capture begins and ends automatically and where tags are associated with individual capture segments. In some embodiments, the data capture may begin and/or end responsive to indication of the user 102.

At 702, the capture module 206 may monitor activity to detect a trigger. The activity may be a system-based activity or a user-based activity. The trigger may include, for example and without limitation, a user action such as opening a work order, opening or bringing into focus a particular software application, a machine-readable instance, an alarm, opening an email regarding an event, or detection that data received from the user 102 relates to an event.

In one example, a work order may relate to an error generated by the monitored system 108. Depending on the trigger definition, the capture module 206 may begin capturing data after, for example, the user opens the work order, brings into focus a software window that will diagnose the error, or when the user 102 inputs commands of a type that relate to remedying the error. In the example given above in regards to completing a task on a remote device, the capture module 206 may begin capturing data upon detection that the user has opened a software application with the capability to connect to the remote device.

In yet another example, an input/output device such as a camera or microphone may detect that the user 102 is conducting acts related to the event. In this example, image recognition or speech recognition may be employed in order to initiate the capturing of data. In one illustration of this example, image recognition software may detect that the user 102 has began to operate on an object that relates to the event. In another illustration of this example, the event may be a query or review submitted by a customer. Speech recognition software may be used to detect that the user 102 has began a conversation with the customer and to subsequently begin data capture by the capture module 206.

At 704, the capture module 206 may begin capture of data after detection of the trigger at the operation 702. The data capture at the operation 704 may be similar or the same as the data capture described above with respect to the operation 302 of the process 300.

At 706, the capture module 206 terminates the data capture (e.g., stops capturing data). The termination may be in response to another trigger, such as a system-based activity or a user-based activity. For example, as the capture module 206 captures data, the capture module 206 may be configured to continue to monitor the user 102 and the system to detect a point at which it is highly unlikely that relevant data will be captured. This point may be, for example and without limitation, when the user closes a work order, when a task is marked as completed, when an event has closed, when a system state reaches a pre-defined point, or when the user and/or system is inactive.

At 708, the segmentation module 208 may segment the capture data into capture segments in a manner similarly described in regards to the operation 304 of the process 300. Although FIG. 7 depicts segmentation as a sequential step, the process 700 may iteratively or simultaneously segment the capture data.

At 710, the tagging module 214 may associate tags with individual capture segments. The tags may be associated automatically (without user intent), and/or by the user. For example, the tags may be generated based on data accessed, audio (e.g., possibly after processing by speech recognition software, etc.), and so forth. The tagging module 214 may use, without limitation, image recognition, speech recognition, computer language analysis tools, and other taxonomical tools in order to generate tags that make the content of the capture segments discoverable. The granularity of the generated tags may vary depending on their use. Furthermore, the tagging module 214 may automatically generate and associate tags with the event, environment, monitored system, or any other component effecting decision-making of the user 102. According to some embodiments, the tagging module 214 may use portions of the logic used to segment the capture data to automatically generate tags to associate with individual capture segments. For example, tagging module 214 may detect interest points in order to segment the data. The logic used to detect interest points or other points at which to segment the capture data may overlap with the functionality needed to associate tags with individual capture segments. Alternatively, separate logic may be used for segmentation (the operation 708) and tag association (the operation 710). Although tagging is discussed herein, any other suitable method of indexing, classifying, or categorizing events, environments, systems, and/or individual capture segments may be employed.

At 712, the selection module 210 may present the capture segments to the user 102 for selection and optionally for annotation. As discussed similarly in regard to the operation 306 in the process 300, the operation 712 may be performed to select and prepare the captured data for dissemination to the user community 110. The user 102 may select capture segments for publication that are relevant to the user community 110.

At 714, the annotation module 212 may enable the user 102 to make annotations to the capture segments to explain, introduce, or otherwise draw attention to a particular portion of the capture segments. The annotations may comprise, for example and without limitation, one or more of: inserting a slide, text, audio, video, speech-to-text, video-to-text, video-to-audio, synchronized time, animation, handwriting, highlighting, image insertion, image recognition data, and statistical analysis. As discussed similarly above, information regarding the user's adherence or departure from a standard operating procedure (SOP) may be appended to the capture segments. For example, if the user follows the SOP for the first three steps or branches and then departs from the SOP for the following two steps or branches, such information may be graphically or otherwise appended in an annotation to the capture segments. Furthermore, the opportunity to make annotations may allow the user to select particular portions of the data for publication. For example, the user may highlight or indicate, via an annotation, an application window in a video capture of a screen, rather than the entirety of the video capture of the screen (illustrated in FIG. 6).

In some embodiments, the annotation module 212 may also present the automatically generated tags to the user for editing and/or addition of the user's own tags. Allowing the user 102 the opportunity to edit the automatically generated tags or to add the user's own tags ensures that the user's perception of the taxonomy of the capture segments is accurately represented by the tags associated with the capture segments. Furthermore, this may help ensure that members of the user community 110 may be able to find the selected and/or annotated capture segments using the tags.

At 716, the publication module 216 may publish the selected capture segments to the user community 110. As discussed above in regard to the operation 308 in the process 300, publication may take any of a variety of forms. In addition to the embodiments discussed above, one additional embodiment includes using the tags to publish the selected capture segments more accurately to certain members of the user community 110. More specifically, the publication module 216 may present to a second user an option to view the selected capture segments based at least in part on detecting that at least one tag associated with the selected capture segments substantially relates to or deviates from data received from the second user and/or a tag of an event and/or system that the second user is interacting with. In some embodiments, work orders, customer queries, or other similar tasks to be addressed by a user in the user community 110 may include an option to view recent, highest ranked, or most commented selected capture segments that relate to the work order, customer query, or other similar task.

According to one embodiment, the process 700 may continue to monitor user activity to detect a trigger throughout all of the operations discussed above. In the case that a trigger is detected at any point after capture of data has already previously stopped, the process 700 may return to the operation 704 and begin to capture data once again. The process 700 may then proceed accordingly in regards to the newly captured data and append the results to the previously captured data.

In various embodiments, at least some portions of the process 700 may be performed using a shadow environment. For example, a solution to a problem may be reconstructed by reconstructing events using traces of data stored while an event is taking place, and accessed after the event is complete. This data may be used to reconstruct at least some of the events, and thus to create segments of captured data, and/or other information, as described above in the process 700. In some embodiments, a shadow environment may be used to test variations of solutions and/or may be used for training the user community to implement the solution.

FIG. 8 is a flow diagram of an illustrative process 800 to segment captured data and terminate capture of data. The process 800 illustrates a possible variation of the process 700, where the segmentation may be performed as an ongoing process rather than as a batch process at the end of the capture (or at other times). Thus, the process 800 may be performed as part of the process 700, and may replace the operation 708.

At 802, the capture module 206 may capture data similar to or the same as described above with reference to the operation 302 of the process 300.

At 804, the capture module 206 determines whether to start a new segment. The determination to start a new segment may be based on an analysis of the tasks being performed and or other data. The determination may include analysis of factors such as elapsed time, user actions, user issued commands, system changes, and/or other information. Examples of the determinations may be similar or the same as the interest points discussed above, and used to segment the captured data such as at the operation 708 in the process 700. When the capture module 206 determines to start a new segment (following the "yes" route from the decision operation 804), then the process 800 may start a new segment at 806 and then capture data for the new segment at the operation 802, thus creating a looped process.

When the capture module 206 determines not to start a new segment (following the "no" route from the decision operation 804), then the process 800 may advance to a decision operation 808. At 808, the capture module 206 may determine whether to terminate the data capture. The determination may be similar to the operation 706 in the process 700. When the capture module 206 determines not to terminate the data capture (following the "no" route from the decision operation 808), then the process 800 may continue to capture data at the operation 802. However, when the capture module 206 determines to terminate the data capture (following the "yes" route from the decision operation 808), then the process 800 may terminate the data capture and advance to an operation 810.

At 810, the segmented captured data may be presented to the user and/or processed as described in any of the operations 710-716 in the process 700.

FIG. 9 is a flow diagram of an illustrative process 900 to compare operations performed in data segments to operations in a standard operating procedure (SOP). The process 900 illustrates another possible variation of the process 700, where the data segments may be analyzed using operations included in an SOP. Thus, the process 900 may be performed as part of the process 700.

At 902, the segmented data may be retrieved or otherwise made accessible. At 904, the SOP data may be retrieved from a data source that stores the SOP data.

At 906, operations performed in the segments may be compared to operations in the SOP to determine variations from the SOP, conformance with the SOP, and/or other possible information. The operations may be identified based on keywords, tags, and/or other designators.

At 908, results of the comparison may be determined as one of conforming (following the "yes" route to an operation 910), non-conforming (following the "no" route to an operation 912), or not available (n/a) (following the "n/a" route to an operation 912). The operations 908, 910, and 912 may provide designations that indicate the respective results of the comparison. The designations may be stored for later access at an operation 916 and may be provided to the user for selection, published, and/or used in other ways. The operations 906-916 may be repeated until all segments are compared to the SOP.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A computer-implemented method comprising:
under control of one or more computing devices configured with executable instructions,
detecting a trigger associated with an event, the detecting to initiate a collection of data associated with a computing activity;
collecting, from a computing device associated with a user, data associated with the computing activity that is performed in part based on inputs from a user and in response to the event, wherein collecting the data includes capturing one or more of screen renderings from a display associated with the computing device and audio data from an input device associated with the computing device;
storing the data as collected data;
segmenting the collected data into data segments;
analyzing, by a processor, performance of the computing activity in the data segments with respect to a standard operating procedure for resolving a computing related task, wherein the analyzing includes performing one or more of image recognition on one or more of the screen renderings and speech recognition on at least a portion of the audio data;
generating, by the processor based at least in part on the analyzing, one or more tags that describes the data segments, wherein at least one of the one or more tags is based, at least in part, on one or more of the image recognition and the audio data;
associating the one or more tags with the data segments;
receiving, from the user, a selection of one or more of the data segments; and
publishing the selection of one or more of the data segments.

2. The method as recited in claim 1, wherein the data comprises one or more of operating environment data, user input data, user interface graphical data, audio data, or system response data.

3. The method as recited in claim 1, further comprising detecting another trigger, received before the publishing, the detection to terminate the collecting.

4. The method as recited in claim 1, wherein segmenting is based at least in part on one of detecting a change in a focus of a window in a user interface (UI) or detecting a change in a different portion of the UI.

5. The method as recited in claim 1, further comprising storing the selection of one or more of the data segments and the one or more tags associated with the data segments; and wherein the publishing the selection of one or more of the data segments is performed in part by selecting a location or event for publication based in part on the one or more tags.

6. The method as recited in claim 1, wherein the associating the one or more tags with the data segments includes systematically determining information associated with the data segments.

7. The method as recited in claim 1, further comprising receiving from the user an annotation to the selection of one or more of the data segments.

8. The method as recited in claim 7, wherein the selection of one or more of the data segments are maintained after the publishing to allow further selection and annotation by the user or other users after the publishing.

9. The method as recited in claim 7, wherein the annotation comprises one or more of: inserting a slide, text, audio commentary, highlight or shape to the selection of one or more of the data segments.

10. The method as recited in claim 7, wherein the annotation comprises information regarding how the collected data diverges or adheres to a standard operating procedure (SOP) for handling the event.

11. The method as recited in claim 1, wherein the publishing further includes:
    causing the selection of one or more of the data segments to be presented to a user community; and
    receiving from the user community, one or more of comments, ratings, and tags for association with the data segments.

12. The method as recited in claim 1, further comprising presenting the data segments to perform at least operations of view, select, annotate, and edit.

13. A system, comprising:
    at least one computing device configured to implement one or more services, wherein the one or more services are configured to:
        detect a first indication of an event that triggers data collection;
        collect data from a computing device associated with a user to form collected data, wherein collecting the data includes capturing one or more of screen renderings from a display of the computing device associated with the user or audio data from an input device associated with the computing device associated with the user;
        segment the collected data into data segments;
        analyze the collected data in at least one of the data segments, wherein the analyzing includes to perform one or more of image recognition on one or more of the screen renderings or speech recognition on at least a portion of the audio data;
        generate one or more tags that describe the at least one of the data segments, wherein at least one of the one or more tags is based, at least in part, on one or more of the image recognition and the audio data;
        associate the one or more tags with the data segments;
        receive a selection of the data segments; and
        publish the selection of the data segments.

14. The system as recited in claim 13, wherein the segment the collected data is based at least in part on one of detecting a change in a focus of a window in a user interface (UI) or detecting a change in a different portion of the UI.

15. The system as recited in claim 13, wherein the one or more services are further configured to:
    receive an annotation to the selection of the data segments; and wherein the selection of the data segments is maintained after the publish to allow further selection and annotation after the publish.

16. The system as recited in claim 13, wherein the one or more services are further configured to:
    cause the selection of the data segments to be presented to a user community; and
    receive from the user community, one or more of comments, ratings, and tags for association with the selection of the data segments.

17. The system as recited in claim 13, wherein the data comprises one or more of user interface graphical data, user input data, or audio data.

18. One or more computer-readable media storing computer-executable instructions that, when executed on one or more processors, performs acts comprising:
    collecting data associated with a computing activity to form collected data wherein collecting the data includes capturing one or more of screen renderings from a display associated with a computing device of a user and audio data from an input device associated with the computing device;
    segmenting the collected data into data segments;
    analyzing the collected data in at least one of the data segments, wherein the analyzing includes performing one or more of image recognition on one or more of the screen renderings and speech recognition on at least a portion of the audio data;
    generating one or more tags that describe the at least one of the data segments;
    associating the one or more tags with the data segments, wherein at least one of the one or more tags is based, at least in part, on one or more of the image recognition and the audio data;
    receiving a selection of the data segments; and
    publishing the selection of the data segments.

19. The one or more computer-readable media as recited in claim 18, wherein the acts further include:
    receiving annotation to selection of the data segments, the annotation comprises one or more of inserting a slide, text, audio commentary, highlight or shape to the selection of the data segments.

20. The one or more computer-readable media as recited in claim 18, wherein the publishing further includes:
    causing the selection of the data segments to be presented to a user community; and
    receiving from the user community, one or more of comments, ratings, and tags for association with the selection of the data segments.

* * * * *